United States Patent [19]
Miller et al.

[11] Patent Number: 5,327,248
[45] Date of Patent: Jul. 5, 1994

[54] COMPRESSED IMAGE VIRTUAL EDITING SYSTEM

[75] Inventors: Robert F. Miller, Modesto; Steven M. Blonstein, San Jose, both of Calif.

[73] Assignees: Ricoh Company, Ltd., Tokyo, Japan; Ricoh Corporation, Menlo Park, Calif.

[21] Appl. No.: 857,037

[22] Filed: Mar. 23, 1992

[51] Int. Cl.⁵ .......................................... H04N 1/411
[52] U.S. Cl. .................. 358/261.4; 358/432; 358/433; 358/452; 358/453; 382/56; 348/415; 348/416
[58] Field of Search ............... 358/133, 136, 433, 436, 358/426, 432, 261.1, 261.4, 261.2, 452, 453; 382/56

[56] References Cited

U.S. PATENT DOCUMENTS

| | | | |
|---|---|---|---|
| 4,558,374 | 12/1985 | Kurata et al. | 358/287 |
| 4,633,503 | 12/1986 | Hinman | 382/47 |
| 4,665,555 | 5/1987 | Alker et al. | 382/41 |
| 4,750,044 | 6/1988 | Nakajima | 358/280 |
| 4,797,739 | 1/1989 | Tanaka | 358/133 |
| 4,800,425 | 1/1989 | Schweryel et al. | 358/136 |
| 4,814,898 | 3/1989 | Arimoto et al. | 358/260 |
| 4,827,330 | 5/1989 | Walsh et al. | 358/280 |
| 4,837,635 | 6/1989 | Santos | 358/287 |
| 4,851,906 | 7/1989 | Koga et al. | 358/133 |
| 4,868,570 | 9/1989 | Davis | 341/106 |
| 4,896,208 | 1/1990 | Moriya et al. | 358/78 |
| 4,906,991 | 3/1990 | Fiala et al. | 341/51 |
| 4,910,611 | 3/1990 | Cok | 358/453 |
| 5,033,106 | 7/1991 | Kita | 382/56 |
| 5,107,345 | 4/1992 | Lee | 358/432 |

OTHER PUBLICATIONS

JPEG-9-R6 Working Draft for Development of JPEG CD, Jan. 14, 1991, "Digital Compression and Coding of Continuous-tone Still Images," Part I: Requirements and Guidelines.

JPEG-10-R2 Working Draft for Development of JPEG CD, May 18, 1991, "Digital Compression and Coding of Continuous-tone Still Images," Part II: Compliance Testing.

IEEE Spectrum, Oct. 1991, The Institute of Electrical and Electronics Engineers, Inc., "Video Compression Makes Big Gains," Peng H. Ang, et al.

Primary Examiner—Edward L. Coles, Sr.
Assistant Examiner—John Ning
Attorney, Agent, or Firm—Townsend and Townsend Khourie and Crew

[57] ABSTRACT

In an image compression system using a typical image compression scheme, a pointer array is provided to point to each of the many MCUs in a compressed image file. From all the blocks of an image, a subset of the blocks is selected as a virtual image. The virtual image is edited, and each edited block is compressed into an edited block. The edited block is compressed into an edited MCU and placed in an edited block region, and the pointer to the original MCU is changed to point to the new MCU. In this way, the pointer array can be modified to perform an Undo operation. An edge table is provided to hold values where each value, when combined with the differential value for a block on the edge of the virtual image, provides an absolute value for the block without reference to blocks beyond the edge of the virtual image. The entries in the edge table are determined from the compressed MCUs without the blocks being fully decompressed. More than one edge table can be provided. In an image editor, a virtual image is decompressed from a compressed image, the virtual image is processed, and recompressed. The recompressed, edited blocks are then placed in a edited block memory.

14 Claims, 4 Drawing Sheets

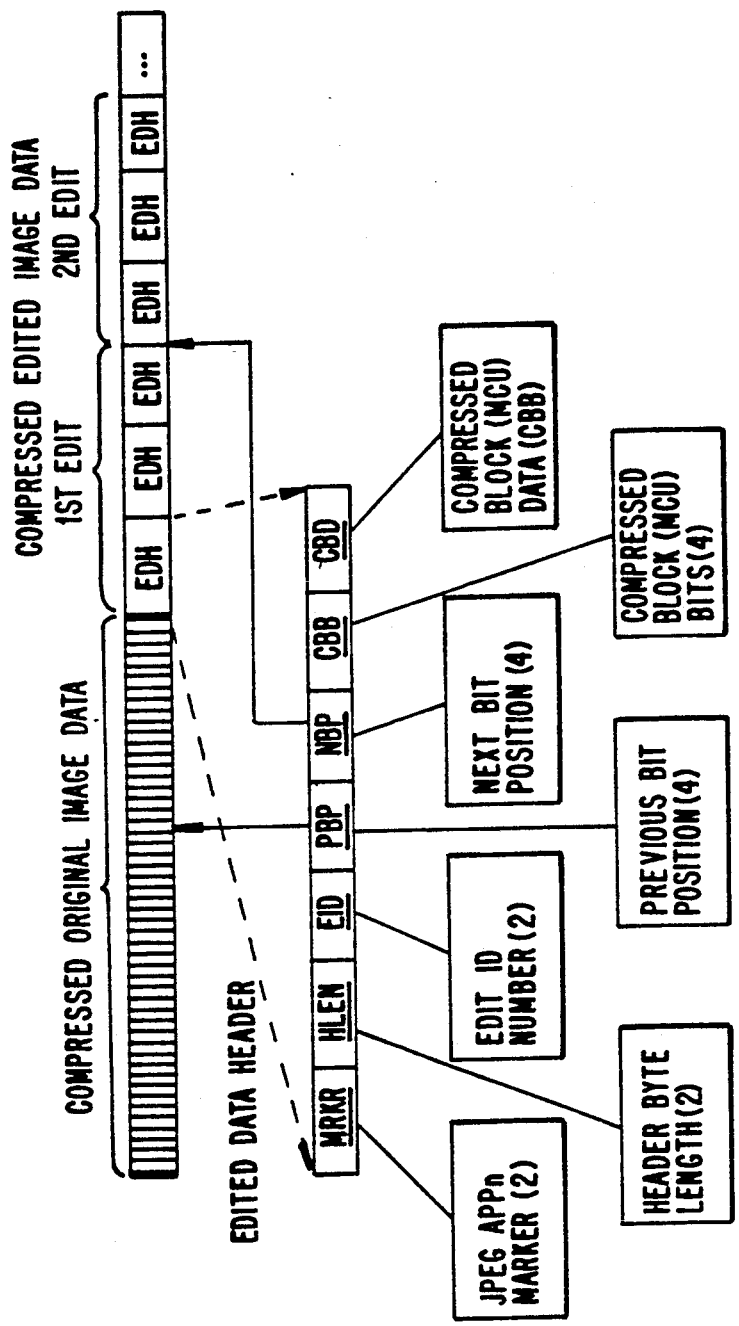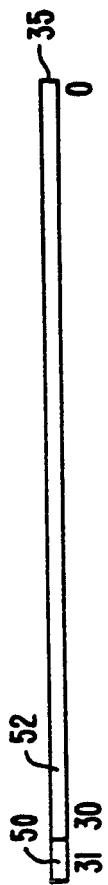
FIG. 6.
FIG. 5.

COMPRESSED IMAGE VIRTUAL EDITING SYSTEM

BACKGROUND OF THE INVENTION

The present invention relates to the field of editing compressed images. More specifically, in one embodiment the invention provides means for editing portions of compressed images without decompressing the entire image.

Modern color imagery for cameras and scanners require huge amounts of memory to store image files containing a data representation of the input or scanned image. A typical image such as that used with a color copier with 8.5"×11" (216 mm×297 mm) paper, a resolution of 400 dots per inch (15.75 per mm), and 3 bytes (24 bits) to represent the intensity of each dot, would occupy 44.88 megabytes of memory. In addition to the size of the memory, the memory must have high bandwidth for real time applications, such as a color copier where 15 pages per minute is a typical demand. This implies a bandwidth, or data rate, of 11.22 megabytes/second. Both these requirements drive up the cost of imaging systems. Compression techniques have been used to solve both the bandwidth and the storage problems for quite a while. With compression, an image file can be stored in less memory, and moves faster across any bandwidth limited channel because of the lower number of bits used to represent an image. Compression involves passing the raw image data into a compressor, which combines and analyzes the patterns in the raw data to produce a compressed image file where the original image is not readily discernable without a corresponding decompression.

If an image is to be edited, scaled, rotated, or otherwise processed, random access to any or all of the pixels is required. Once the processing is complete, the edits must be saved to the image file. If the image file being processed is compressed, the conventional means for obtaining random pixel access is to decompress the image into a frame store, perform the processing, and then recompress the image into a new image file. The problem with this is that no memory is saved by decompressing, since memory is needed for the frame store. The bandwidth is also lowered, since compression and decompression of entire images takes time. This additional processing time and memory is often wasted, since even the most expensive display in an imaging system could not display the entire image a full resolution.

One solution is to allow only limited in-line real-time manipulation, manipulating the image as it moves through a channel from one compressed image to another. Unfortunately, only a small area can be processed at once, and such a scheme cannot be adapted to interactive editing.

Compression methods for compressing image data are known. One such compression standard is JPEG (Joint Photographic Experts Group). Other standards include JBIG, Fax G3 or G4, and GIF. In JPEG, to give one example, an image is represented by a two-dimensional array of picture elements, or pixels. If the image is grayscale, each pixel is represented by an intensity value, and if the image is color, each pixel is represented by several values. Before compressing the image data, the image is divided into blocks of eight by eight pixels each. Within each block, the 64 pixels are transformed, using a discrete cosine transform, into 64 frequency amplitudes, a DC value and 63 AC values. Rather than encoding the DC value directly, the DC value of the block preceding the current block is subtracted from the DC value of the current block, and the resulting differential DC value is stored. Because the typical image being compressed has a constant color within each eight by eight pixel block and a relatively slowly changing average color value, this scheme results in greatly compressed images. Many other image compression schemes use similar techniques for compression and the use of differential values.

An image comprises raw pixel data indicating color or intensity at a number of pixel locations, usually a two-dimensional grid. Pixels are grouped into blocks, and each block is compressed separately. The process of compression involves transforming the 64 values associated with the block into one differential DC value and 63 AC values, and reducing the number of bits needed to describe the transformed values through entropy encoding. Each block is compressed into a minimum coded unit (MCU), the MCUs which make up a compressed image are tagged with identifying information, such as the block location within the image, length data to indicate how many bits are contained in the MCU, and the like, and the MCUs are stored sequentially in an image file. Length data is needed since MCUs vary in length. The length is determined by the entropy encoding step. A block which is very ordered, such as a uniformly colored block will compress into a relatively small MCU as compared to a block with more color variation. The process of entropy encoding is generally referred to as coding, whereas a compressing process involves blocking, cosine transforming and coding image data. Significantly, differential DC values can be read from an MCU which has been decoded only, since full decompression is not necessary. This savings in processing resources may be significant since cosine transforms and inverse transforms can be very computationally intensive operations.

To decompress an image, each MCU from an image file is decompressed into a block, by reverse operation of the differential encoding of the DC value and by an inverse cosine transform. While differential encoding of slowly changing values from block to block increases the compression, it increases the difficulty of decompressing only a part of an image, since decompression of some MCUs in the partial image will require reference to MCUs which are not in the partial image. Further difficulties arise in partial decompression when the partial image is edited and recompressed. Because the degree of compression depends on the image data, an edited partial image will usually be a different size when compressed compared with the original image. Consequently, simply replacing the MCUs from the partial image with the MCUs from the edited partial image is impractical, unless the entire image is decompressed, edited and recompressed. From the above it is seen that an improved method for manipulating and editing compressed images is needed.

SUMMARY OF THE INVENTION

The present invention allows for pixel level manipulation of images that remain in a compressed form. In an image compression system using a typical image compression scheme, a pointer array is provided to point to each of the many MCUs in a compressed image file.

From all the blocks of an image, a subset of the blocks is selected as a "virtual" image.

The virtual image is decompressed/decoded and edited, each edited block is compressed into an edited block, and the pointers to the original MCUs are changed to point to edited MCUs, which are stored in the edited image data region. In this way, the pointer array can be modified to perform an "Undo" operation.

The present invention provides a means for handling differentially encoded values within MCUs where not all MCUs are decoded. An edge table is provided to hold values, where each value, when combined with the differential value for a block on the edge of the virtual image, provides an absolute value for the block without reference to blocks beyond the edge of the virtual image. The entries in the edge table are determined from the compressed MCUs without the blocks being fully decompressed. More than one edge table can be provided to improve the speed of computing absolute values from differential values, where speed is more valuable than the storage space used up for the additional tables. Computation of absolute values is faster, on the average, with more edge tables, since computational speed is proportional to the distance from a block to the nearest edge having an edge table.

The present invention also provides a means for reindexing a compressed edited image, to resort all the MCUs and replace MCUs from the original image data region with MCUs from the edited image data region. The described embodiment of the present invention works with image data compressed according to the JPEG standard, but the invention is applicable for any image compression scheme where blocks are compressed into variable sized MCUs or where the data is encoded with differential values whereby reference must be made to other MCUs in order to fully decode an MCU.

In an image editor according to the present invention, a compressed image is loaded in a main memory area, and selected blocks to be edited are decompressed from the main memory area, passed to the editor, edited, and recompressed by a compressor. The recompressed, edited blocks are then placed in an edited block memory. A pointer array is provided to point to blocks either in the main memory area or the edited block memory, such that the pointers in the array point to each block of the image after editing.

A further understanding of the nature and advantages of the inventions herein may be realized by reference to the remaining portions of the specification and the attached drawings.

BRIEF DESCRIPTION OF THE DRAWINGS

FIG. 5 shows a pointer from a pointer array; and

FIG. 6 shows the fields of an edit header for an edited MCU.

DESCRIPTION OF THE PREFERRED EMBODIMENTS

Figure 1:
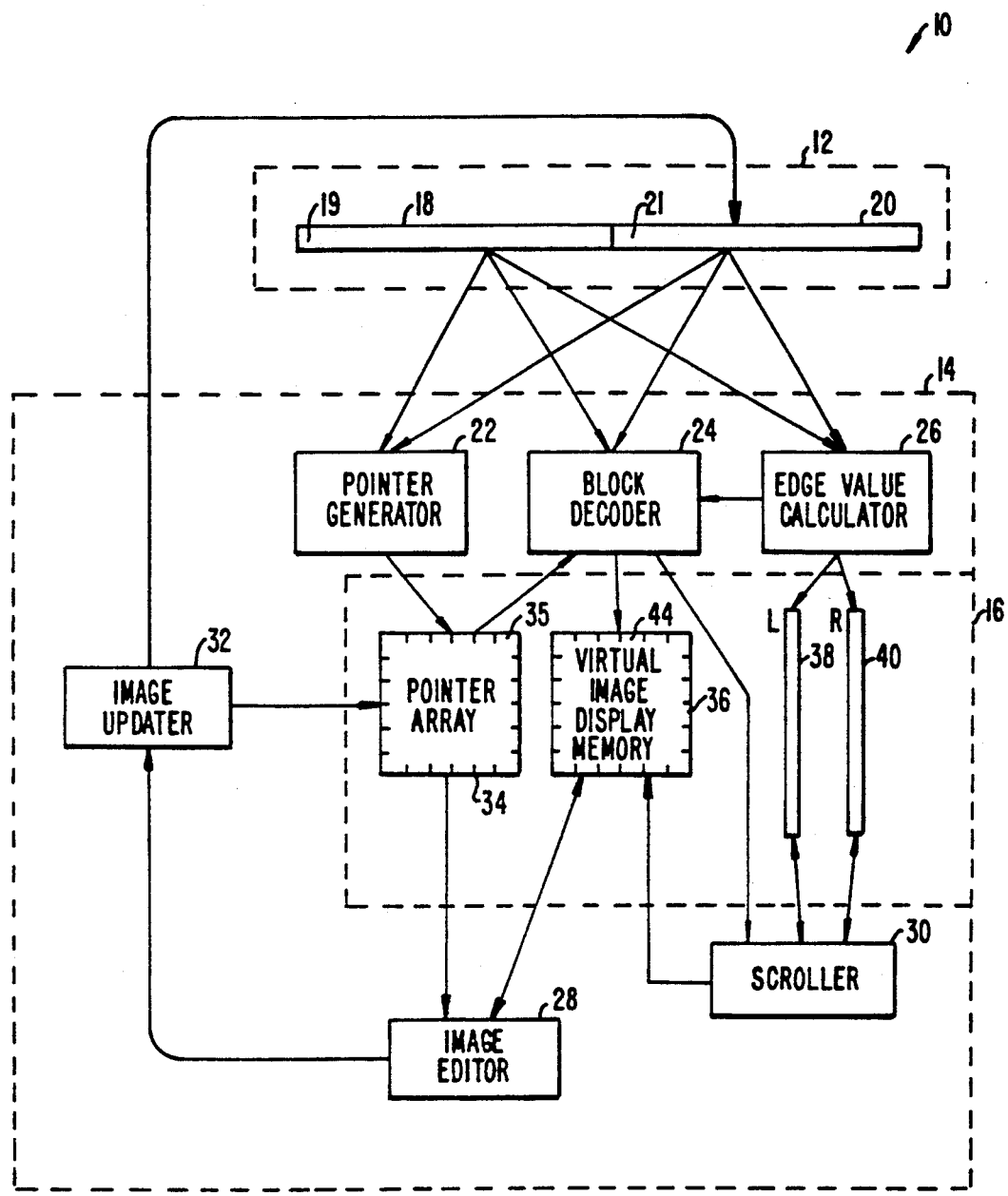
FIG. 1 is a block diagram of an editing system according to the present invention.

FIG. 1 functionally illustrates an embodiment of an editing system 10 according to the present invention. Editing system 10 includes a compressed image memory 12, an image processor 14, and an image memory 16. Compressed image memory 12 includes an original image data region 18 containing a compressed image 19 and an edited image data region 20 for holding edited MCUs 21. Image processor 14 includes a pointer generator 22, a block decoder 24, an edge value calculator 26, an image editor 28, a scroller 30 and an image updater 32. These elements of image processor 14 could be implemented as discrete hardware, software subroutines run by the processor, or a combination of the two.

Image memory 16 includes a pointer array 34, a display memory 36, a left edge table 38 and a right edge table 40. Compressed image memory 12 is digital memory such as random access memory (RAM), magnetic disk, or other storage media.

Before any editing is done on compressed image 12, edited image data region 20 is empty and contains no edited MCUs 21. The amount of memory allocated to edited image data region 20 can be varied according to the needs of the user or application based on the amount of editing to be done and the need for multiple undo operations. The initialization of image memory 16 will now be described.

Image memory 16 is initialized at the start of an editing session, or whenever a new compressed image is loaded into compressed image memory 12. An image comprises a two dimensional array of blocks. For color images, the image is first subdivided into several color layers and each color layer is treated as a single image. In the following discussion, only a single color layer image will be described, but the the principles discussed can be extended to multiple color layers in a straightforward manner. A block typically contains an eight pixel by eight pixel square, providing 64 intensity values when uncompressed, and an image is formed by an N by M array of such blocks. Since each block is 8×8 pixels, for an 8.5"×11" image at 400 pixels per inch, N is 425 and M is 550, for a total of 233,750 blocks per image. Continuing with this example, compressed image 19 would contain 233,750 MCUs containing compressed data. If the image in compressed image memory 12 has been edited and has not been reindexed, edited image data region 20 will contain MCUs of compressed data, with each MCU in region 20 replacing an MCU in original image data region 18. If a block has been edited more than once, region 20 will contain more than one MCU which might replace an MCU in region 18, however only one edited MCU will actually replace the block in region 18. Pointer generator 22 scans region 18 and places a pointer to the start of each MCU into pointer array 34. Because of the one-to-one correspondence between blocks and pointers, pointer array 34 contains N×M, or 233,750 entries.

Figure 2:
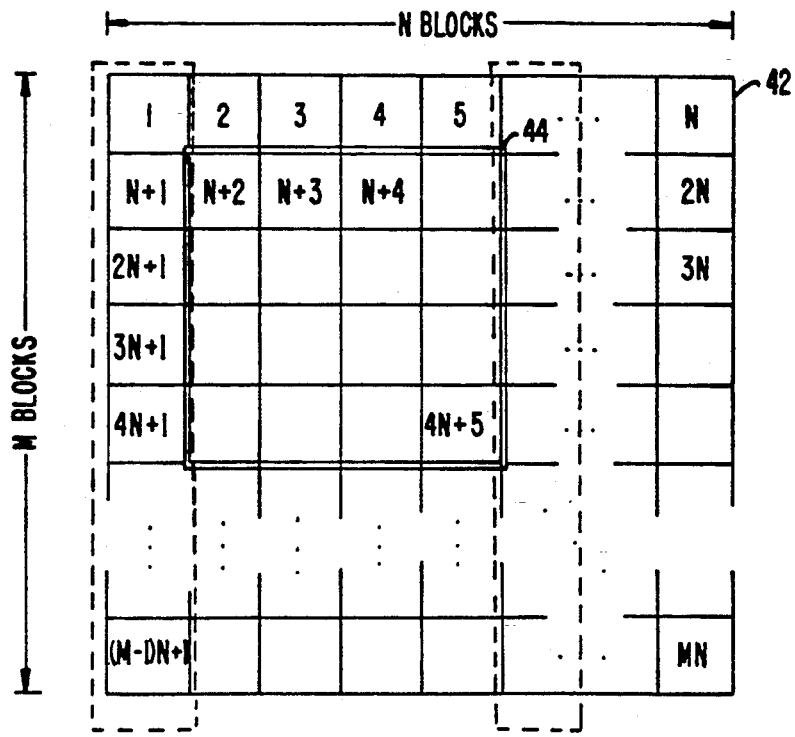
FIG. 2 shows a memory map of a display memory and a compressed image in a two-dimensional array.
Figure 3:
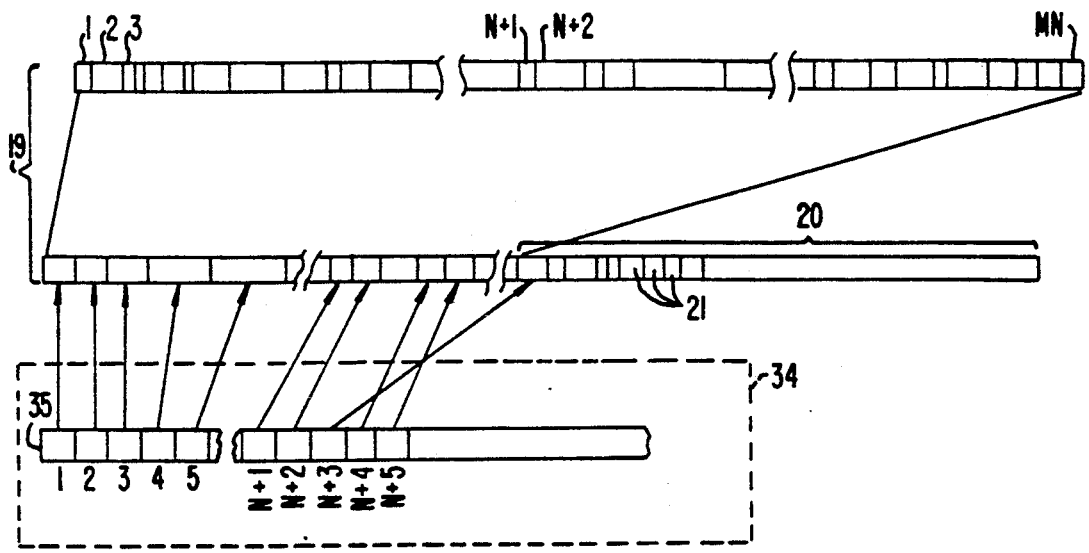
FIG. 3 shows an image file containing MCUs and a pointer array, each in a linear array.

FIGS. 2 and 3 better illustrate how the pointers in pointer array 34 are arranged. A first pointer 35 points to the first MCU of compressed image 19. Other pointers are likewise associated with blocks and their corresponding MCUs. Pointer array 34 can be logically arranged in a two dimensional array as shown in FIG. 1 to correspond with the arrangement of blocks in the image, or it can be arranged in a one dimensional array as shown in FIG. 3. Each pointer points to an MCU in region 18 or, as in the case of pointer n+3, to an MCU in region 20.

Referring again to FIG. 1, once each MCU in region 18 is scanned, pointer generator 22 scans edited image data region 20. Each MCU in region 20 contains image data replacing the data in another MCU. The MCU in region 20 either replaces an MCU in region 18, if the MCU is the first editing of an original MCU, or replaces another MCU in region 20 if the MCU has already been edited. Each MCU in region 20 contains a pointer to the MCU which is replaced. Therefore, pointer generator 22 simply scans each MCU in region 20, identifies the block associated with the MCU and updates the pointer for that block in pointer array 34. Pointer generator 22 scans region 20 from older edits to newest edits, so that if multiple edits exist in region 20 for a single block, only the latest MCU for that block is pointed to by a pointer in pointer array 34.

Once pointer array 34 is initialized, block decoder 24 uses the pointers in array 34 to find selected MCUs in region 18, however in other embodiments, block decoder 24 locates MCUs in region 18 without reference to pointer array 34, although using pointer array 34 is preferred since it avoids duplication of processing. Block decoder 24 could decode the entire image stored in compressed image memory 12, however several benefits of the present invention would be lost.

Typically, image editing will only concern a small portion of the full image at a time. This portion, a "virtual image", is decoded and then manipulated by editor 28 as a complete image. FIG. 2 illustrates how a virtual image 44 relates to a full image 42. In FIG. 2, full image 42 measures N by M blocks, while virtual image 44 measures four by four blocks.

Returning to FIG. 1, but continuing the example above, virtual image 44 is the selected virtual image for editing, and block decoder 24 decodes only the sixteen blocks of virtual image 44 and places the resulting blocks into display memory 36. From display memory 36, virtual image 44 can be processed, displayed, or just stored. Significantly, image processor 14 need not devote processing resources and time to decompressing the entire full image, but only the MCUs relating to blocks within virtual image 44.

During initialization, block decoder 24 operates in parallel with edge value calculator 26, although in other embodiments, their operation is serial or totally independent. Edge value calculator 26 scans the MCUs in compressed image memory 12, evaluating only the differential values in each MCU, which being differential, require reference to a reference MCU. For one standard, the JPEG standard, each MCU contains a differential value for DC intensity, and the reference MCU for any MCU is the MCU for the block to the left of the block being decoded. For example, to find the absolute DC value for block n+2 (see FIG. 2), a differential value is extracted from MCU n+2 and the absolute DC value for block n+1 is subtracted from the extracted value. However, since block n+1 is not decompressed, (since it is not within virtual image 44), only the DC value is extracted from that block by edge value calculator 26. To avoid the delays when panning a virtual image across a full image, left and right edge tables 38,40 are provided.

Figure 4:
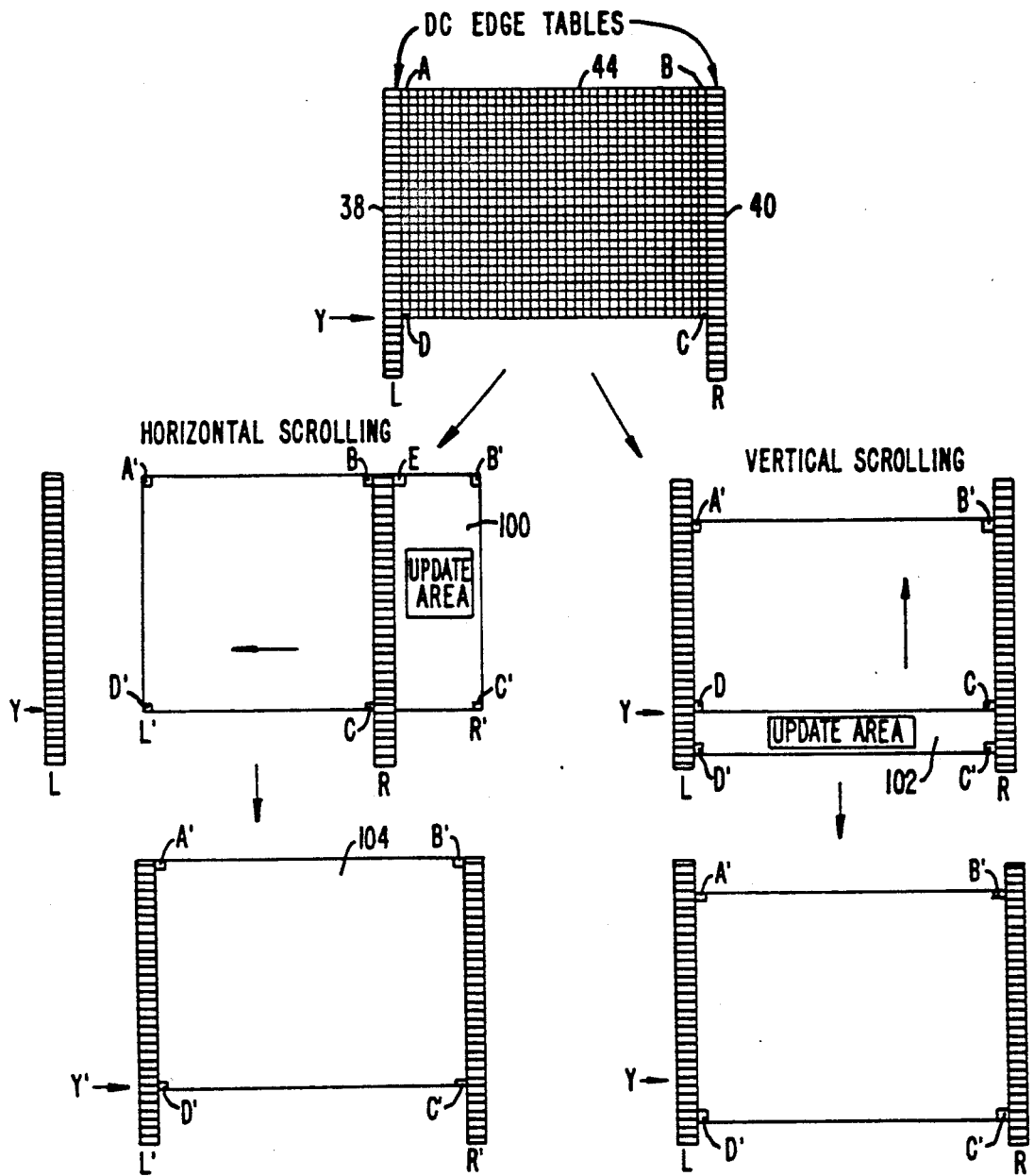
FIG. 4 shows a virtual image and corresponding edge tables and illustrates the use of the edge tables.

FIG. 4 better illustrates the relationship between the edge tables and virtual image 44, which is stored in display memory 36. Virtual image 44 is initially bounded by blocks A, B, C and D. Left edge table 38 contains one entry for each row of full image 42, and the table will often reach beyond the bounds of virtual image 44. The entry for each row contains an absolute DC value for the block in that row and just to the left of the left-most column of blocks in virtual image 44. For example, left edge table entry Y is the DC absolute value for the block in the full image which would be to the left of block D. Similarly, right edge table 40 contains entries for the DC absolute values of blocks in the right-most columns of virtual image 44. Thus tables 38,40 each contain M entries.

When virtual image 44 is scrolled horizontally across full image 42, new blocks in update area 100 are decompressed and moved into display memory 36. Without the edge tables, to fully decompress a block the DC differential values for each block to the left of the blocks being decoded must be summed. Instead, with the right edge table, only one sum or subtraction is needed. For example, when block E is decompressed the absolute DC value for block E is found from the differential DC value in the MCU for block E, and the absolute DC value for block B, which is stored in the right edge table. As each new column is introduced into the virtual image, the edge tables are updated with the absolute DC values for the new columns. For example, the entry which held the absolute DC value for block B would hold the absolute DC value for block E after scrolling left one column. In other compression schemes, a top and a bottom edge table might be used, where differential values reference blocks above and below a block being decoded. The resulting virtual image 104 and resulting edge tables L' and R' are shown.

Two edge tables are not strictly necessary, but for larger virtual images less computation is required during scrolling when two tables are used. If, for example, right edge table 40 is not present, the absolute DC value for block E could be determined from the left edge table, summing the differential DC values for each block in the top row of virtual image 44. Even with one edge table, the number of sums required is reduced by the number of blocks between the edge of the virtual image having the edge table and the edge of the full image. Since edge value calculator 26 determines the absolute DC values for blocks including those in virtual image 44, these values can be provided to block decoder 24 which uses the values to decode MCUs.

When a virtual image is scrolled, scroller 30 uses the DC values in the edge tables to provide offsets for MCUs being scrolled into the virtual image. For example, if the virtual image were panned such that the left edge of the virtual image moved from the 205th column of the full image to the 204th column, MCUs for blocks in the 204th column and also within the new virtual image would need to be decoded and placed into display memory 36. Instead of performing 203 subtractions to find the absolute DC value of a block in the 204th column, the absolute DC values for each block in the 204th column can be read from the appropriate entry of the left edge table. The left edge table is then updated to hold the absolute DC values of the 203rd column, which are calculated from the absolute DC values of the 204th column and the DC differential values of the 204th column.

Similarly, if the right edge of the virtual image is the 204th column, right edge table 40 contains the absolute DC values for the 205th column. When scrolling right one column, scroller 30 directs block encoder 24 to decode the MCUs corresponding to the blocks of the new virtual image. The new blocks are in the 205th column, so the absolute DC values for those blocks are readily available in right edge table 40. The right edge table is then updated, changing each entry therein by the differential DC value of the blocks in the 205th column, resulting in the DC values for blocks in the 206th column.

When the virtual image is scrolled up, the edge tables do not change, but different entries are used. Since the edge tables extend the length of the full image 42, the virtual image can be scrolled from the top to the bottom of the full image without needing to change any entries in the edge tables.

Image editor 28 can be an interactive device where a person edits the image while viewing the contents of display memory 36, or image editor 28 can be an automated process. One application is the modification of an image within a copier in response to commands input by a user with or without the user viewing the contents of display memory 36. When an edit is saved, image updater 32 recompresses the edited block into an edited MCU, stores the edited MCU at an available location in the edited image data region 20, and updates the pointer in pointer array 34 associated with that block to point to the newly saved edited MCU. Image updater 32 also saves a reference field with the edited MCU indicating which block the newly saved MCU replaces. This way, if image editor 28 initiates an "undo" operation, image updater 32 can simply change the pointer to point to the MCU referenced by the newly saved MCU, effectively cancelling the previous edit. Image updater 32 and image editor 28 are also capable of operating on more than one block simultaneously. Since image updater 32 updates pointer array 34 for each edited MCU, pointer array 34 is up to date, and compressed image memory 12 need not be scanned by pointer generator 22, until a new compressed image is loaded into compressed image memory 12.

FIG. 5 shows a pointer 35 from pointer array 34. In the described embodiment, the pointer is 32 bits, the most significant bit for holding an edit flag 50 and the remaining 31 bits forming an MCU address 52. "Virtual" editing is accomplished by using tools to alter the image data in display memory 36. When pixels within a block are edited, the edit flag in the pointer for that block is set. Because editing could affect the absolute DC value for the edited block, the edit flag in the pointer for the block to the right of the edited block is also set, because the differential DC value for the block on the right changes with the absolute DC value for the block on the left. Once an editing session is complete, pointer array 34 is scanned for set edit flags. For each flagged area, MCUs are decoded from compressed image 12, starting from the left visible MCU for each row of blocks of the flagged area, to determine the DC values for the blocks to the left of each edited block. If an edited MCU falls on the left-most or right-most edge, the DC edge table is updated with the new value.

As shown in FIG. 6, the new edit data is appended to the original image data region 18 in edited image data region 20. Thus, pointer array 34 can address compressed image memory 12 as a single linear memory. Once the edited MCU is created, the edit header fields shown in FIG. 6 are initialized, the edited MCU is stored in region 20, and the pointer in the pointer array is initialized to point to the start of the edit header in the newly stored edited MCU.

The MRKR and HLEN fields are provided so that the edited MCUs conform to the JPEG standard. The PBP field points to the previous version of the MCU. The previous version is in region 18 for the first edited MCU of a block, but if an edited MCU is edited again, the PBP field of the second edited MCU will point to the first edited MCU. The NBP field in the first edited MCU is then set to point forward to the second edited MCU, thus forming a linked list. The CBB field indicates the number of image data bits to follow, thus allowing the image file to be scanned by skipping from one header to another until the desired header is found. The CBD field contains the image data itself. Again, since the data in the CBD field is entropy encoded, the number of bits varies from MCU to MCU. These fields allow an edited image file to be read sequentially into a new image file, reordering the MCUs in the edited region into an image file where the edited MCUs are incorporated into the original data region of the new image file, and the edited region of the new image file is empty.

The above description is illustrative and not restrictive. Many variations of the invention will become apparent to those of skill in the art upon review of this disclosure. Merely by way of example, the separately identified units of image processor 14 could be implemented as one or more software programs running on a computer, or the functionality of the units could combined or further subdivided. The scope of the invention should therefore be determined not with reference to the above description, but instead with reference to the appended claims along with their full scope of equivalents.

WHAT IS CLAIMED IS:

1. A method for handling a portion of a compressed image for editing, wherein the image is divided into blocks, each block being represented by digital data, and wherein the digital data for each block is compressed into a minimum coded unit, a plurality of said minimum coded units forming a compressed image data packet, the method comprising the steps of:

creating a pointer array, wherein each pointer in said pointer array points to a minimum coded unit within the compressed image data packet;

selecting blocks from the image to define a virtual image;

decompressing a set of minimum coded units corresponding to said virtual image;

editing said virtual image to form at least one edited block;

compressing said edited block into a edited minimum coded unit;

saving said edited minimum coded unit in an edited block memory; and modifying a pointer in said pointer array, said pointer corresponding to said edited block, said pointer being modified to point to said edited minimum coded unit in said edited block memory, whereby said blocks, whose corresponding minimum coded units are pointed to by the pointers of said pointer array as modified in said modifying step, collectively define an edited image.

2. The method of claim 1, wherein the step of selecting blocks selects less than all the blocks of the image.

3. The method of claim 1, wherein said editing step comprises the steps of:

displaying said virtual image on a display;

accepting input commands, where said input commands are instructions for modifying said virtual image;

applying said instructions to said virtual image resulting in a modified virtual image; and displaying said modified virtual image on said display.

4. The method of claim 1, where said steps of editing, compressing said at least one edited block, and modifying said pointer, are repeated more than once.

5. The method of claim 1, wherein a block is a single pixel.

6. The method of claim 1, wherein said each pointer comprises an edit flag and an address value.

7. The method of claim 1, wherein a minimum coded unit comprises a minimum coded unit header and a minimum coded unit body, wherein said minimum coded unit header comprises an image block identifier and a length field indicating the number of bits in said minimum coded unit, and wherein said minimum coded unit body comprises at least one relative value and a plurality of absolute values for qualities of an image block.

8. The method of claim 1, wherein the minimum coded units contain differentially encoded values for a quality of a block, the method further comprising the steps of:

determining an absolute value for said quality for a plurality of blocks adjacent to an edge of said virtual image;

creating an edge table for holding said absolute values; and using said edge table to determine absolute values for said quality for new blocks decompressed and added to said virtual image.

9. The method of claim 8, wherein said new blocks are added in a scrolling operation.

10. A method for handling a portion of a compressed image for editing, wherein the image is divided into blocks, each block being represented by digital data, including at least one relative value, wherein an absolute value is determined for a block by reference to relative values for other blocks, the method comprising the steps of:

selecting blocks from the image to define a virtual image corresponding to the portion of the compressed image;

determining an absolute value for each of a plurality of blocks adjacent to an edge of said virtual image;

creating an edge table for holding said absolute values; and using said edge table to determine absolute values for blocks decompressed and added to said virtual image.

11. An apparatus for handling a portion of a compressed image for editing, wherein the image is divided into blocks, each block comprising pixel data representing the digitized image at points corresponding to each pixel in each block, and wherein the image is stored as minimum coded units in a compressed image data packet, the compressed image data packet, wherein each minimum coded unit corresponds to one block, the apparatus comprising:

a pointer array, where each pointer of said pointer array points to a minimum coded unit, said pointer array collectively pointing to the compressed image data packet;

a compressed data memory for holding the compressed image data packet;

a virtual image memory for holding blocks corresponding to a virtual image;

an edited data memory for holding edited minimum coded units corresponding to edited blocks of said virtual image; and means for modifying a pointer in said pointer array corresponding to an edited block, said means for modifying modifying said pointer to point to an edited minimum coded unit corresponding to said edited block.

12. The apparatus of claim 11, wherein said compressed data is compressed according to the JPEG standard.

13. The apparatus of claim 11, wherein the pixel data represents a grayscale intensity.

14. The apparatus of claim 11, wherein the pixel data comprises more than one digital value, each digital value representing the intensity of one color.

* * * * *